United States Patent [19]

Bülow

[11] Patent Number: 5,793,511
[45] Date of Patent: Aug. 11, 1998

[54] OPTICAL RECEIVER WITH AN EQUALIZING CIRCUIT FOR PMD-INDUCED INTERFERENCE, AND SYSTEM WITH SUCH AN OPTICAL RECEIVER

[75] Inventor: Henning Bülow, Stuttgart, Germany

[73] Assignee: Alcatel Alsthom Compagnie Generale d'Electricite, Paris, France

[21] Appl. No.: 825,275

[22] Filed: Mar. 27, 1997

[30] Foreign Application Priority Data

Mar. 29, 1996 [DE] Germany ............... 196 12 604.5

[51] Int. Cl.$^6$ ............................................. H04B 10/18
[52] U.S. Cl. ................................. 359/161; 359/189
[58] Field of Search ......................... 359/495, 497, 359/156, 161, 158, 192, 126, 127, 188, 195

[56] References Cited

U.S. PATENT DOCUMENTS

| | | | |
|---|---|---|---|
| 5,311,346 | 5/1994 | Haas et al. | 359/156 |
| 5,610,909 | 3/1997 | Shaw | 370/291 |
| 5,659,412 | 8/1997 | Hakki | 359/156 |

FOREIGN PATENT DOCUMENTS 0578380  1/1994  European Pat. Off.

OTHER PUBLICATIONS

"Polarization –mode–dispersion equalization experiment using a variable equalizing optical circuit controlled by a pulse–waveform–comparison algorithm", T. Ozeki et al, OFC (Optical Fiber Conference) '94 Technical Digest, pp. 62–64.

Primary Examiner—Wellington Chin
Assistant Examiner—William Fountaine, III
Attorney, Agent, or Firm—Ware, Fressola, Van Der Sluys & Adolphson LLP

[57] ABSTRACT

An optical receiver is presented, which can receive and evaluate an optical signal (S) containing interference caused by polarization mode dispersion (PMD). The optical receiver has a splitting facility (1.1) which splits the routable optical signal (S) into two electrical signal components ($S_-$, $S_+$). The electrical signal components ($S_-$, $S_+$) are processed in an equalizing circuit (1.2). A control facility (1.3) controls the splitting facility (1.1) with the aid of a quality signal (Q) produced by the equalizing circuit (1.2).

9 Claims, 3 Drawing Sheets

OPTICAL RECEIVER WITH AN EQUALIZING CIRCUIT FOR PMD-INDUCED INTERFERENCE, AND SYSTEM WITH SUCH AN OPTICAL RECEIVER

BACKGROUND OF THE INVENTION

1. Field of the Invention

The invention concerns an optical receiver for an optical system in which polarization mode dispersion (PMD) causes interference in the optical signals. In addition the invention concerns an optical system for transmitting an optical signal via an optical fiber network, with an optical transmitter at the transmitting end of the system and with an optical receiver at the receiving end.

2. Description of Related Art

The polarization mode dispersion occurring in monomode fibers manifests itself in a two-way propagation of an optical signal. If a fiber exhibits double refraction, namely different conditions of propagation in the two orthogonal polarization directions (principal optical axes), the result is a breakup of the fundamental fiber mode into two vertically polarized modes. The optical signal propagates at different speeds along the two principal optical axes, resulting in a time difference between a "fast" and a "slow" signal component.

From the publication by Takeshi Ozeki et al, "Polarization-mode-dispersion equalization experiment using a variable equalizing optical circuit controlled by a pulse-waveform-comparison algorithm", OFC (Optical Fiber Conference) '94 Technical Digest, pages 62 to 64, it is known that the polarization mode dispersion PMD represents a limit for the bandwidth in optical transmission systems. This publication proposes an equalizing circuit whereby the effects of the PMD can be equalized. The proposed equalizing circuit is an optical equalizing circuit which is inserted in the light path ahead of the optical receiver proper. The optical equalizing circuit has a TE-TM converter, optical delay lines with different delays for TE and TM modes, and variable optical phase shifters.

Such an optical equalization concept is used to equalize the double refraction of a transmission fiber which causes the PMD, by means of a special fiber (polarization maintaining fiber) of a fixed length. This special fiber has a double refraction which is complementary to the transmission fiber. However the PMD in optical transmission systems is not constant in time. Therefore the length of the special fiber in the mentioned optical equalization concept must be variable. In practice this is only possible at a very high cost.

SUMMARY OF THE INVENTION

The invention now has the task of presenting another equalization concept. An equalization concept which solves the task finds application in an optical receiver; such an optical receiver is the subject of the first aspect of the present invention. The invention has the additional task of presenting an optical system; the optical system is the subject of the second aspect of the present invention.

According to the present invention, an optical receiver comprises a splitting facility for splitting a routable optical signal into two electrical signal components, wherein the first electrical signal component exits from a first output and the second electrical signal component exits from a second output of the splitting facility, an equalizing circuit responsive to the electrical signal components for processing them and for providing a derived data signal via an output of the equalizing circuit and for providing a quality signal at an output of the equalizing circuit, and a control facility responsive to the quality signal for controlling the splitting facility.

According to another aspect of the present invention, a system for transmitting an optical signal via an optical fiber network with an optical transmitter at the transmitting end of the system and an optical receiver at the receiving end is characterized in that the optical receiver has a splitting facility which splits the routable optical signal into two electrical signal components, wherein the splitting facility is responsive to control signals and wherein the first electrical signal component exits from a first output, and the second electrical signal component exits from a second output of the splitting facility for providing the electrical signal components to an equalizing circuit for processing the electrical signal components and for providing a data signal, and in that the optical receiver has a control facility responsive to a quality signal from the equalizing circuit for providing said control signals.

These and other objects, features and advantages of the present invention will become more apparent in light of the detailed description of a best mode embodiment thereof, as illustrated in the accompanying drawing.

BRIEF DESCRIPTION OF THE DRAWING

The invention is explained in greater detail in the following by means of drawings, where.

BEST MODE FOR CARRYING OUT THE INVENTION

Figure 1:
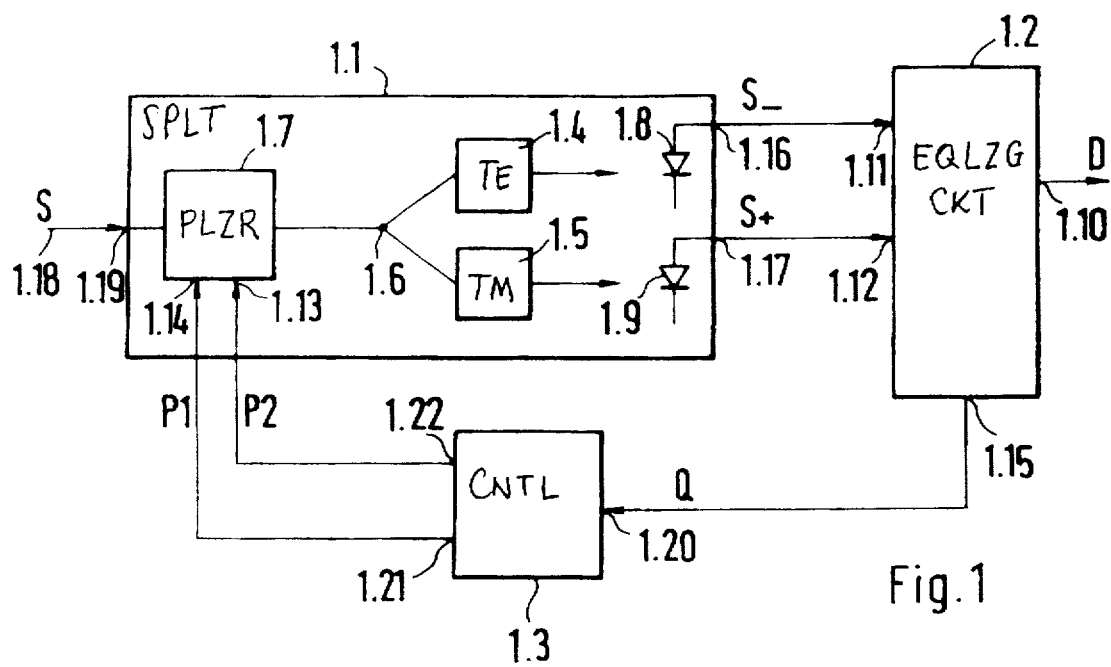
FIG. 1 is a first configuration example of an optical receiver.

FIG. 1 illustrates a first configuration example of an optical receiver which is part of an optical system. The optical receiver is connected via an optical fiber waveguide 1.18 to an optical fiber network which e.g. has a star-shaped structure. Optical signals that are emitted by one or more optical transmitters can be fed to the optical receiver via this optical fiber network. The following only considers the optical receiver and the components that are significant for the invention.

The optical receiver has a splitting facility 1.1, an equalizing circuit 1.2 and a control facility 1.3. An input 1.19 of the splitting facility 1.1 is connected to the optical fiber 1.18. In this way the splitting facility 1.1 can receive an optical signal S from the optical fiber network and split it into two electrical signal components $S_-$, $S_+$. The electrical signal components $S_-$, $S_+$ come from the optical signal S, which may be distorted by the polarization mode dispersion PMD; because of this distortion the electrical signal components $S_-$, $S_+$ are time-shifted with respect to each other. The electrical signal component $S_-$ exits from output 1.16 of the splitting facility 1.1, and the electrical signal component $S_+$ exits from output 1.17 of splitting facility 1.1. The equalizing circuit 1.2 is located downstream of the splitting facility 1.1. Output 1.16 is connected to input 1.11 of the equalizing circuit 1.2, and output 1.17 is connected to input 1.12. The equalizing circuit 1.2 is used to correct the delay distortion of the reciprocally time-shifted electrical signal components $S_-$, $S_+$ which may have different signal amplitudes. The equalizing circuit 1.2 has an output 1.10 for a data signal D derived from the optical signal S, and an output 1.15 for a quality signal Q produced therein, whereby conclusions can be formed regarding the signal quality of the received optical signal S. The data signal D is fed to a further signal processor. The quality signal Q is fed to an input 1.20 of the control facility 1.3, from which it produces control signals P1, P2 for splitting facility 1.1. The control signals P1, P2 exit from the control facility 1.3 through outputs 1.21, 1.22.

The splitting facility 1.1 has an optical polarization controller 1.7, an optical splitter 1.6, two optical polarizers 1.4, 1.5 and two photodiodes 1.8, 1.9. An optical polarization splitter can also be used instead of the optical splitter 1.6 and the optical polarizers 1.4, 1.5. The optical signal S and the (electrical) control signals P1, P2 are fed to the optical polarization controller 1.7. The optical polarization controller 1.7 has two inputs 1.13, 1.14 for the control signals P1, P2; input 1.13 is connected to output 1.22 of the control facility 1.3, and input 1.14 is connected to output 1.21. The (electrically controllable) optical polarization controller 1.7 is e.g. an arrangement of two adjacent plates to which a fiber length is attached. Rotating the plates exerts a torsional force on the fiber length, which can be influenced by the control signals P1, P2. This allows any desired adjustment of the polarization of the optical signal S. The optical polarization controller 1.7 can also be a waveguide structure in an electro-optical crystal (lithium-niobite), whose index of refraction can be selectively changed by an electrical field applied from the outside. In can also be configured as a liquid crystal element, which is also controllable by an electrical field. The affected optical signal S exits from the optical polarization controller 1.7 and is split into two paths by the optical splitter 1.6. One path contains the optical polarizer 1.4 which only allows the TE mode to pass, the other path contains the optical polarizer 1.5 which only allows the TM mode to pass. The optical signal S that is allowed to pass by the optical polarizers 1.4, 1.5 strikes one of the photodiodes 1.8, 1.9. The photodiode 1.8 produces the electrical signal component $S_-$ and the photodiode 1.9 produces the electrical signal component $S_+$.

Figure 2:
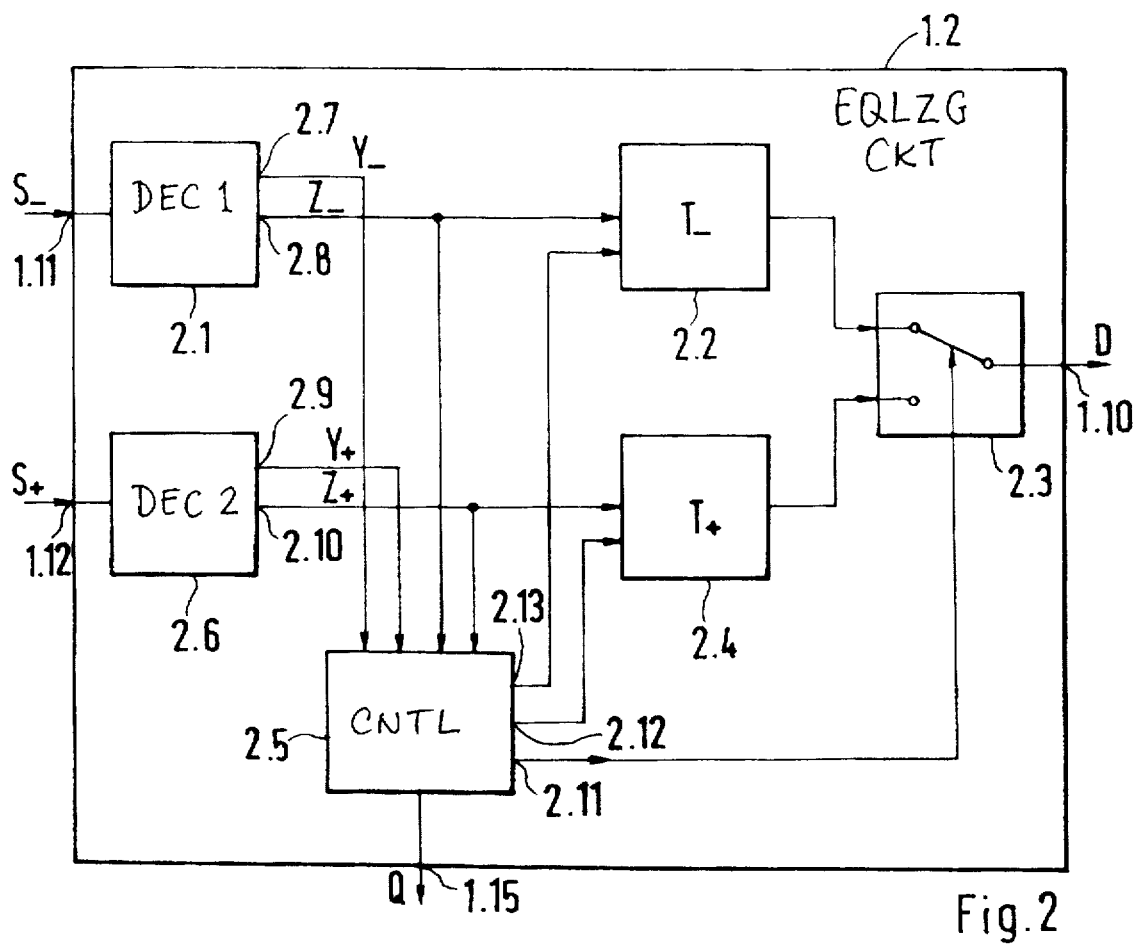
FIG. 2 is a configuration example of an equalizing circuit located in the optical receiver.

The preceding description makes it clear that propagation time is not influenced by the optical part of the optical receiver; the optical part only influences the polarization planes of the optical signal S. In the invention the influence of the propagation time, thus an equalization, takes place exclusively in the electrical part of the optical amplifier; the equalizing circuit 1.2 provided for that purpose is described in the following by means of FIG. 2.

The equalizing circuit 1.2 has two multistage decision circuits 2.1, 2.6, two delay lines 2.2, 2.4, a switch 2.3 and a control facility 2.5. The multistage decision circuit 2.1 is connected to input 1.11; it receives the electrical signal component $S_-$. Both outputs 2.7, 2.8 are connected to the control facility 2.5. Output 2.8, from which a signal $Z_-$ derived from the electrical signal component $S_-$ is obtained, is additionally connected to the delay line 2.2.

The multistage decision circuit 2.6, which has two outputs 2.9, 2.10, is connected to input 1.12; it receives an electrical signal component $S_+$. Both outputs 2.9, 2.10 are connected to the control facility 2.5.; output 2.10, from which a signal $Z_+$ derived from the electrical signal $S_+$ is obtained, is additionally connected to the delay line 2.4.

The control facility 2.5 derives the quality signal Q and three control signals from the two signals $Z_-$, $Z_+$ coming from the multistage decision circuits 2.1, 2.6. The multistage decision circuits 2.1, 2.6 provide a possibility of deriving the quality signal Q used for optimization. As an alternative, the quality signal Q can also be obtained by determining the bit error rate of the electrical signal components $S_-$, $S_+$, or with the aid of a minimizing method, the high-frequency components contained in the electrical signal components $S_-$, $S_+$. The quality signal Q is fed to the output 1.15 of the equalizing circuit 1.2. The control signal which controls the switch 2.3 exits from an output 2.11 of the control facility 2.5 connected to switch 2.3. The control facility 2.5 evaluates the signals and decides which of the two electrical signal components $S_-$, $S_+$ has the best signal quality; after a possible delay caused by the delay lines 2.2, 2.4, the corresponding signal $Z_{31}$, $Z_+$ is fed to the output 1.10 via the switch 2.3. The control signal, which controls the time delay of delay line 2.2 in a way so that no bit errors occur when switch 2.3 is changed over, exits from an output 2.13 of control facility 2.5 which is connected to the delay line 2.2. The control signal which controls the time delay of delay line 2.4 exits from an output 2.12 of control facility 2.5 which is connected to the delay line 2.4.

Since the electrical signal components $S_-$, $S_+$, and thereby also the signals $Z_-$, $Z_+$, are displaced in time with respect to each other, this time difference must be equalized via the delay lines 2.2, 2.4. The delays of delay lines 2.2, 2.4 can therefore be adjusted continuously or in steps by the control signals.

Figure 3:
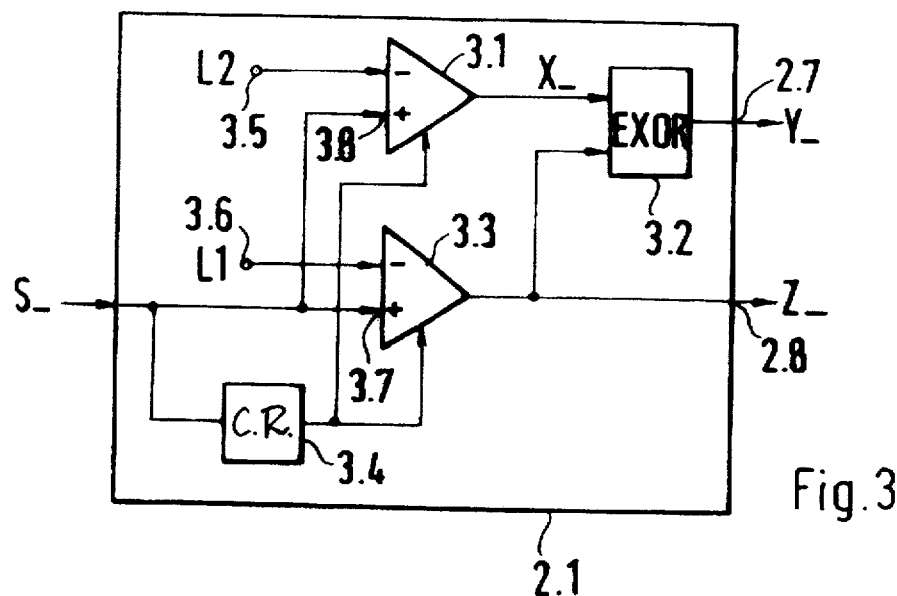
FIG. 3 is a multistage decision circuit located in the equalizing circuit.

The multistage decision circuits 2.1, 2.6 contained in the equalizing circuit 1.2 have the same structure in principle, but the parameters used therein can be different. In lieu of both multistage decision circuits 2.1, 2.6, FIG. 3 illustrates the multistage decision circuit 2.1 in greater detail; it has two comparators 3.1, 3.3, a clock recovery device 3.4 and an EXOR gate 3.2. The electrical signal component $S_-$ is fed to the clock recovery device 3.4, to an input 3.7 of the comparator 3.3 and to an input 3.8 of the comparator 3.1. A specified threshold value L1 can be fed to a further input 3.6 of the comparator 3.3, and a specified threshold value L2 can be fed to a further input 3.5 of the comparator 3.1. The threshold value L1 represents the optimum decision threshold for sampling the electrical signal component $S_-$. The comparators 3.1, 3.3 are timed with the clock recovered by clock recovery device 3.4; the electrical signal component $S_-$ is synchronously sampled with the clock. If the value of the electrical signal component $S_-$ is smaller (larger) than the threshold value L1, the output of comparator 3.3 assumes the logic state "0" ("1") which results in the signal $Z_-$. At the same time comparator 3.1 compares the electrical signal component $S_-$ with the threshold value L2; a signal X exits from the output of comparator 3.1. The EXOR gate 3.2 compares the signals $X_-$, $Z_-$ and emits a signal $Y_-$ that represents an error rate which is a function of the quality of the electrical signal component $S_-$. By means of a determinable change in the error rate, the (suboptimal) sampling with the threshold value L2 reacts faster to changes in the signal quality than the (optimal) sampling with the threshold value L1. The smaller the error rate represented by the signal $Y_-$, the better is the signal quality of the electrical signal component $S_-$. But a small error rate also means that the optical polarization controller 1.7 depicted in FIG. 1 has been properly adjusted by the control signals P1, P2. If the polarization of the optical signal changes, the optical polarization controller 1.7 can be adaptively compensated by varying the control signals P1, P2 and by minimizing the error rate ($Y_-$). The evaluation of the signals $Z_-$, $Z_+$, $Y_-$, $Y_+$ and the generation of the quality signal Q takes place through the control facility 2.5.

Figure 4:
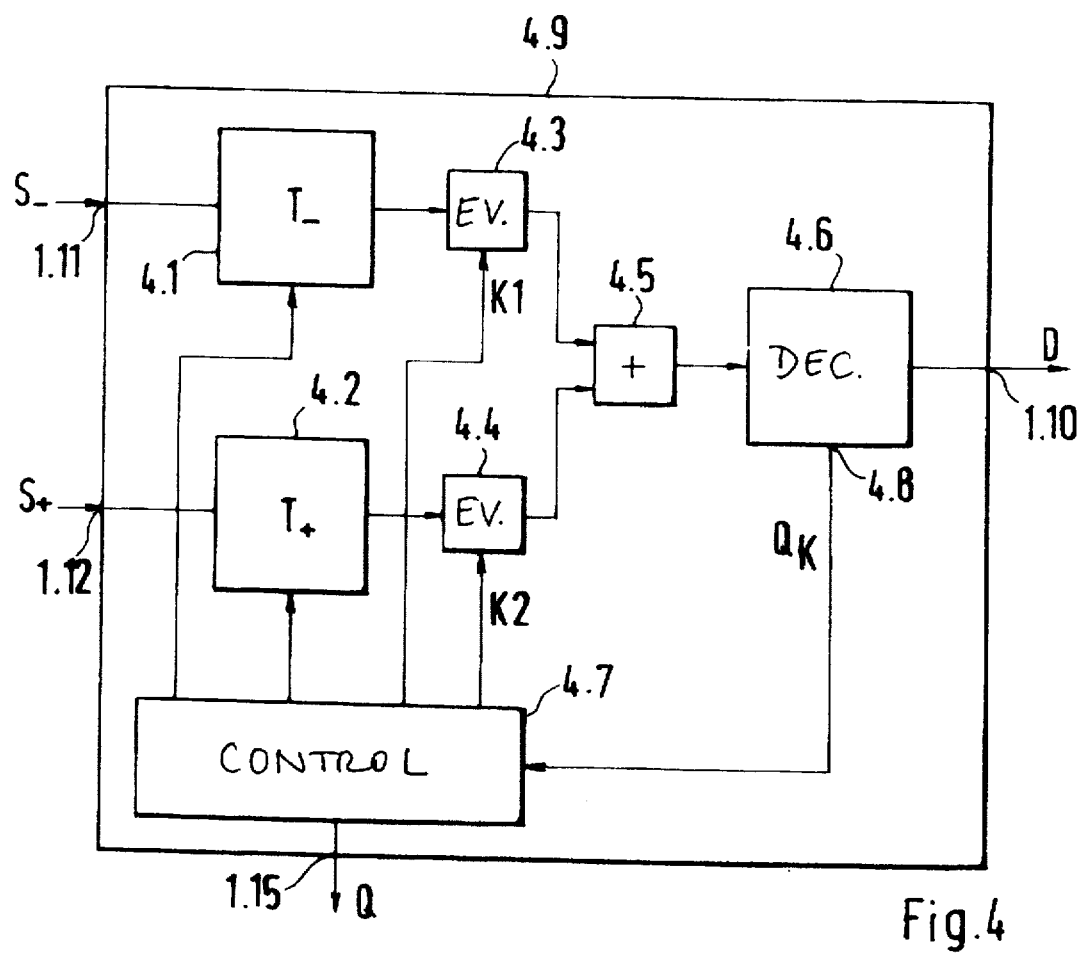
FIG. 4 is a further configuration example of an equalizing circuit.

FIG. 4 illustrates a further configuration example of an equalizing circuit 4.9, whose inputs and outputs have the same reference symbols as the equalizing circuit 1.2 in FIG. 1. The equalizing circuit 4.9 has two delay lines 4.1, 4.2, two evaluation facilities 4.3, 4.4, an adder 4.5, a multistage decision circuit 4.6 and a control facility 4.7. As already explained in connection with FIG. 2, the multistage decision circuit 4.6 could possibly be omitted in this case as well. The electrical signal components $S_-$, $S_+$ are adapted in time with respect to each other by the delay lines 4.1, 4.2. Subsequently the electrical signal component $S_-$ is weighted with the evaluation factor K1 by evaluation facility 4.3, and is fed to one input of the adder 4.5. The electrical signal component $S_+$ is weighted with the evaluation factor K2 by evaluation facility 4.4 and fed to another input of the adder 4.5. The evaluation facilities 4.3, 4.4 are usually electrically controllable amplifiers or attenuators. After the addition the composite signal is fed to the multistage decision circuit 4.6, which in principle has the same structure and function as the multistage decision circuit 2.1 in FIG. 3, so that a detailed description can be omitted in this instance. The data signal D is provided at the output 1.10 and a signal $Q_K$ representing the error rate exits from the multistage decision circuit 4.6 and is fed to the control facility 4.7. Starting with the signal $Q_K$ the control facility 4.7 produces the variable evaluation factors K1, K2, the variable control signals for the delay lines 4.1, 4.2, and the quality signal Q.

Figure 5:
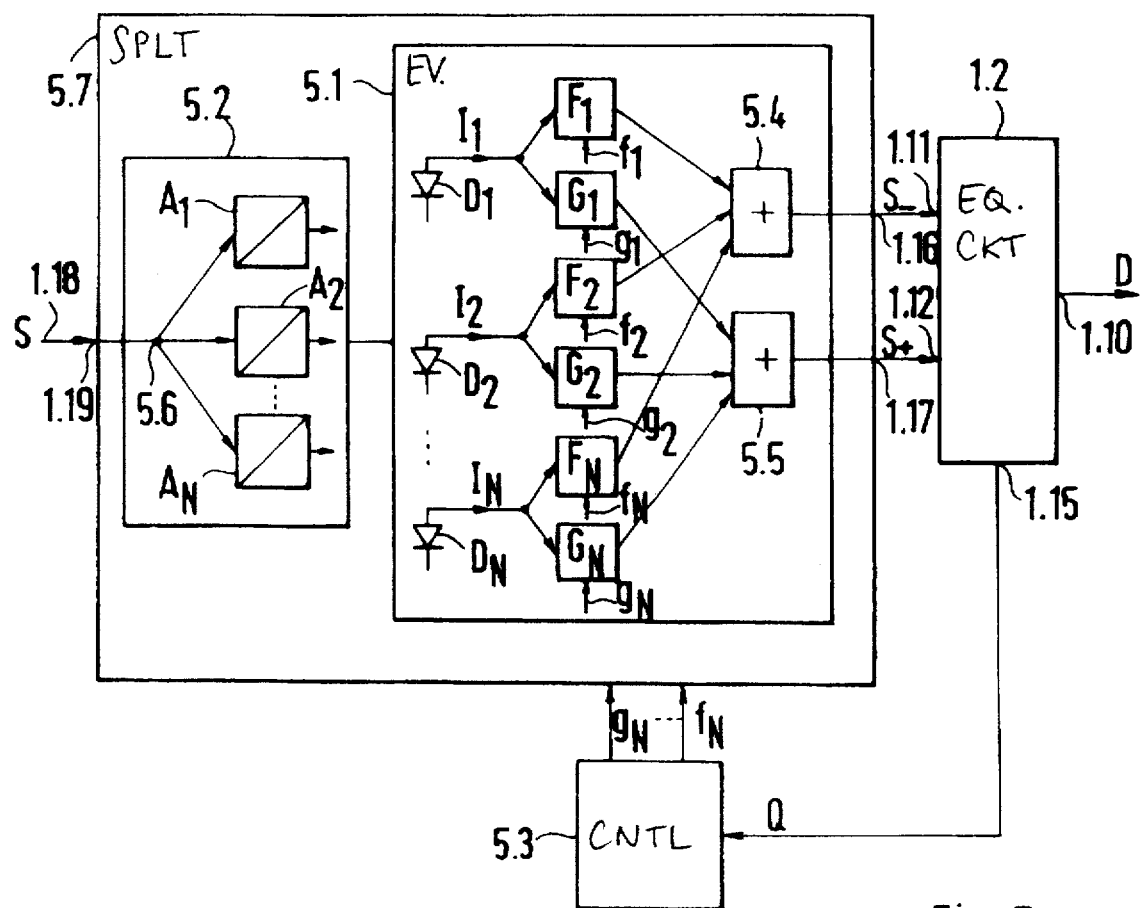
FIG. 5 is a second configuration example of an optical receiver.

FIG. 5 illustrates a second configuration example of an optical receiver with the same structure as the optical receiver in FIG. 1. Differing from the first configuration example, the splitting facility 5.7 has a different internal structure than the splitting facility 1.1 (FIG. 1), and the control facility 5.3 produces different control signals $f_N$, $g_N$ than the control facility 1.3 (FIG. 1). FIG. 5 uses the same reference symbols as FIG. 1 for the inputs and outputs 1.16, 1.17, 1.19 of the splitting facility 5.7; the same reference symbols are also used for the equalizing circuit 1.2 therein.

The splitting facility 5.7 has an arrangement 5.2 of N optical polarizers $A_1$, $A_2$, $A_N$ and an electro-optical unit 5.1. The optical signal S coming from input 1.19 is uniformly split by a splitter 5.6 and fed to the optical polarizers $A_1$, $A_2$, $A_N$. The optical polarizers $A_1$, $A_2$, $A_N$ have fixed but different polarization characteristics, i.e. they allow more or less light to pass depending on the momentary polarization status of the optical signal S.

The arrangement 5.2 is followed by the electro-optical unit 5.1 which contains the photodiodes $D_1$, $D_2$, $D_N$, 2×N evaluation facilities $F_1$, $G_1$ to $F_N$, $G_N$ and 2 adders 5.4, 5.5. One of the photodiodes $D_1$, $D_2$, $D_N$ is assigned to each of the optical polarizers $A_1$, $A_2$, $A_N$ and produces a photoelectric current $I_1$, $I_2$, $I_N$ which is proportional to the optical output. The photoelectric current $I_1$, is split: one part is weighted with a factor $f_1$, by the evaluation facility $F_1$ and one part is weighted with a factor $g_1$ by the evaluation facility $G_1$. A corresponding weighting also takes place for the currents $I_1$, $I_2$, $I_N$. The evaluation facilities $F_1$, $G_1$ to $F_N$, $G_N$ are configured so that a sign inversion of the photoelectric currents $I_1$, $I_2$, $I_N$ is possible, and a subtraction can also be performed in this manner.

The adder 5.4 adds all the signals coming from the evaluation facilities $F_1$, $F_2$, $F_N$ and with them forms the electrical signal component $S_-$ which exits from the output 1.16 of the splitting facility 1.1. The adder 5.5 adds all the signals coming from the evaluation facilities $G_1$, $G_2$, $G_N$ and with them forms the electrical signal component $S_+$ which exits from the output 1.17 of the splitting facility 1.1.

Starting with the quality signal Q (see description of FIG. 2), the control facility 5.3 determines the factors $f_N$ $g_1$ to $g_N$ which are fed as control signals to the evaluation facilities $F_1$, $F_2$, $F_N$.

It is an advantage in this configuration example of an optical receiver that no controllable optical components (polarization controllers) are required. The necessary controls are performed exclusively in the electrical part of the optical amplifier.

Figure 6:
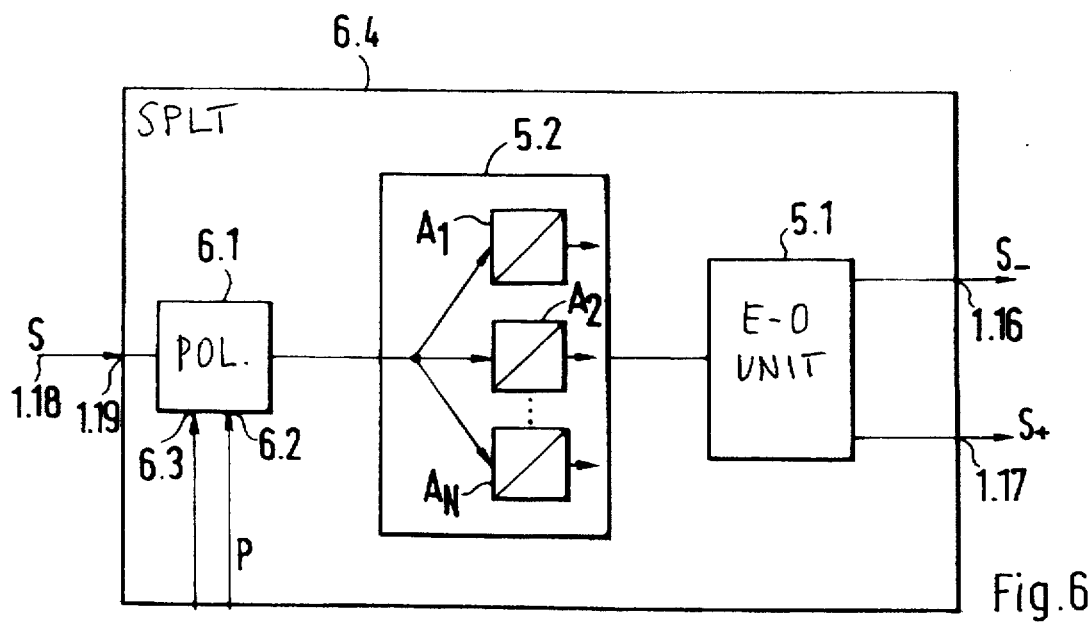
FIG. 6 is a configuration example of a splitting facility.

The previously described concepts of splitting the optical signal S into two electrical signal components $S_-$, $S_+$ can also be combined. FIG. 6 illustrates a configuration example of the splitting facility 6.4 which is the result of a combination. The splitting facility 6.4 comprises an optical polarization controller or polarization switch 6.1 with an arrangement 5.2 of N optical polarizers $A_1$, $A_2$, $A_N$ as already illustrated in FIG. 5, and the electro-optical unit 5.1 therein as well. The polarization switch 6.1 can be a fiber for example, which can be pressed in a defined manner by piezo elements. The polarization switch 6.1 is controlled by two or more control signals P, which are produced e.g. by the control facility 1.3. After that the electrical signal components $S_-$, $S_+$ are processed e.g. by the equalizing circuit 1.2 (FIG. 1).

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. An optical receiver comprising:

a splitting facility (1.1, 5.7, 6.4) for splitting a routable optical signal (S) into two electrical signal components ($S_-$, $S_+$), where the first electrical signal component ($S_-$) exits from a first output (1.16), and the second electrical signal component ($S_+$) exits from a second output (1.17) of the splitting facility (1.1, 5.7, 6.4), an equalizing circuit (1.2, 4.9), responsive to the electrical signal components ($S_-$, $S_+$) for processing the electrical signal components ($S_-$, $S_+$) and for providing a derived data signal (D) via an output (1.10) of the equalizing circuit and for providing a quality signal at an output (1.15) of the equalizing circuit, and a control facility (1.3, 5.3), responsive to the quality signal for controlling the splitting facility (1.1).

2. An optical receiver as claimed in claim 1, in which the splitting facility (1.1) comprises a controllable optical polarization controller (1.7) responsive to said routable optical signal (S) for influencing the polarization of said routable optical signal (S) and for providing a polarization influenced optical signal, an optical splitter (1.6), responsive to the polarization influenced optical signal for splitting the polarization influenced optical signal (S) into two separate polarization influenced optical signals, two optical polarizers (1.4, 1.5) respectively responsive to the two separate polarization influenced optical signals, for providing two orthogonally polarized component optical signals, and two photodiodes (1.8, 1.9) for converting light of the two orthogonally polarized component optical signals coming from the optical polarizers (1.4, 1.5) into said two electrical signal components ($S_-$, $S_+$).

3. An optical receiver as claimed in claim 1, wherein the splitting facility (1.1) comprises:

a controllable optical polarization controller (1.7), responsive to said routable optical signal (S) for influencing the polarization of the optical signal (S) and for providing a polarization influenced optical signal, an optical polarizer, responsive to said polarization influenced optical signal, for splitting the polarization influenced optical signal (S) from the optical polarization controller (1.7) into two orthogonally polarized optical component signals, and two photodiodes (1.8, 1.9), respectively responsive to said component signals, for providing electrical component signals ($S_-$, $S_+$) indicative of said orthogonally polarized optical component signals.

4. An optical receiver as claimed in claim 1, wherein the splitting facility (5.7) comprises an arrangement (5.2) of optical polarizers ($A_1$, $A_2$, $A_N$); and an electro-optical unit (5.1) containing photodiodes ($D_1$, $D_2$, $D_N$), first and second evaluation facilities ($F_1$, $F_2$, $F_N$; $G_1$, $G_2$, $G_N$) and two adders (5.4, 5.5), wherein the optical polarizers ($A_1$, $A_2$, $A_N$) have fixed polarization properties and are responsive to the routable optical signal for providing respective polarizer output signals, where each respective optical polarizer ($A_1$, $A_2$, $A_N$) output signal is provided to a photodiode ($D_1$, $D_2$, $D_N$) that provides a photoelectric current ($I_1$, $I_2$, $I_N$), wherein each photoelectric current is for splitting into first and second currents for respective first and second evaluation facilities ($F_1$, $F_2$, $F_N$; $G_1$, $G_2$, $G_N$), where a first adder (5.4) of said two adders adds first evaluated photoelectric currents ($I_1$, $I_2$, $I_N$) from the first evaluation facilities ($F_1$, $F_2$, $F_N$) for providing the first electrical signal component ($S_-$), and where a second adder (5.5) of said two adders adds the photoelectric currents ($I_1$, $I_2$, $I_N$) from the second evaluation facilities ($G_1$, $G_2$, $G_N$) for providing the second electrical signal component ($S_+$).

5. An optical receiver as claimed in claim 1, wherein the splitting facility (6.4) comprises:

a controllable optical polarization controller or polarization switch (6.1) responsive to said routable optical signal (S) for influencing the polarization of the routable optical signal (S) for providing a polarization influenced optical signal, an arrangement (5.2) of optical polarizers ($A_1$, $A_2$, $A_N$), responsive to the polarization influenced optical signal, for providing a plurality of optical polarizer output signals, and an electro-optical unit (5.1) containing photodiodes ($D_1$, $D_2$, $D_N$), first and second evaluation facilities ($F_1$, $F_2$, $F_N$; $G_1$, $G_2$, $G_N$), and two adders (5.4, 5.5), wherein the optical polarizers ($A_1$, $A_2$, $A_N$) have fixed polarization properties, wherein each optical polarizer ($A_1$, $A_2$, $A_N$) output signal is provided to a respective photodiode ($D_1$, $D_2$, $D_N$) for providing a corresponding photoelectric current ($I_1$, $I_2$, $I_N$) for splitting into a first current and a second current for respective first and second evaluation facilities ($F_1$, $F_2$, $F_N$; $G_1$, $G_2$, $G_N$), where a first adder of said two adders (5.4) adds first evaluated photoelectric currents ($I_1$, $I_2$, $I_N$) from the first evaluation facilities ($F_1$, $F_2$, $F_N$) for providing the first electrical signal component ($S_-$), and where a second adder (5.5) of said two adders adds the photoelectric currents ($I_1$, $I_2$, $I_N$) from the second evaluation facilities ($G_1$, $G_2$, $G_N$) for providing the second electrical signal component ($S_+$).

6. An optical receiver as claimed in claim 5, wherein the control facility (5.3) is responsive to said quality signal for providing evaluation factor signals ($g_N$, $f_N$) to which the evaluation facilities are responsive ($F_1$, $F_2$, $F_N$; $G_1$, $G_2$, $G_N$) for providing said first and second evaluated photoelectric currents to said first and second adders.

7. An optical receiver as claimed in claim 1, wherein the equalizing circuit (1.2) has two multistage decision circuits (2.1, 2.6), two delay lines (2.2, 2.4), a switch (2.3) and a control facility (2.5), where the first multistage decision circuit is responsive to the first electrical signal component ($S_-$) for providing a first signal and a second signal ($Z_-$, $Y_-$), wherein the second multistage decision circuit (2.6) is responsive to the second electrical signal component ($S_+$) for providing a third signal and a fourth signal ($Z_+$, $Y_+$), wherein the control facility is responsive to the first, second, third, and fourth signals for providing the quality signal (Q) and three control signals comprising first and second delay control signals and a switch control signal, wherein the two delay lines (2.2, 2.4) comprise first and second delay lines and wherein said first delay line (2.2) is responsive to said first signal from said first multistage decision circuit (2.1) and to said first delay control signal, for providing a first delayed signal and wherein said second delay line (2.4) is responsive to said second delay control signal, for providing a second delayed signal and wherein the switch (2.3) is responsive to the first and second delayed signals for providing the derived data signal (D) in response to said switch control signal.

8. An optical receiver as claimed in claim 1, wherein the equalizing circuit (4.9) comprises:

two delay lines (4.1, 4.2) comprising a first delay line (4.1) responsive to the first electrical signal component ($S_-$) for providing a first variably delayed signal and a second delay line (4.2) responsive to the second electrical signal component ($S_+$) and to a second variable control signal for providing a second variably delayed signal, two evaluation facilities (4.3, 4.4) comprising a first evaluation facility (4.3) responsive to the first variably delayed signal and to a first variable evaluation factor signal (K1) for providing a first weighted signal and a second evaluation facility (4.4) responsive to the second variably delayed signal and to a second variable evaluation factor signal (K2) for providing a second weighted signal, an adder (4.5) responsive to the first and second weighted signals for providing a composite signal, a multistage decision circuit (4.6) responsive to said composite signal for providing an error rate signal ($Q_K$) and said derived data signal (D), and a control facility (4.7) for providing the quality signal (Q), the first and second variable control signals and the variable evaluation factor signals.

9. A system for transmitting an optical signal (S) via an optical fiber network, with an optical transmitter at the transmitting end of the system, and with an optical receiver at the receiving end, characterized in that the optical receiver has a splitting facility (1.1, 5.7, 6.4) which splits the routable optical signal (S) into two electrical signal components ($S_-$, $S_+$), wherein the splitting facility is responsive to control signals and wherein the first electrical signal component ($S_-$) exits from a first output (1.16), and the second electrical signal component ($S_+$) exits from a second output (1.17) of the splitting facility (1.1, 5.7, 6.4) for providing the electrical signal components ($S_-$, $S_+$) to an equalizing circuit (1.2, 4.9) for processing the electrical signal components ($S_-$, $S_+$) and for providing a data signal, and in that the optical receiver has a control facility (1.3, 5.3) responsive to a quality signal from the equalizing circuit for providing said control signals.

* * * * *